United States Patent [19]

Honas

[11] Patent Number: 5,769,712
[45] Date of Patent: Jun. 23, 1998

[54] COMBINE UTILIZING BELT CONVEYOR ROLLER AS AN ACCELERATOR ROLL

[75] Inventor: Robert Honas, Independence, Mo.

[73] Assignee: AGCO Corporation, Independence, Mo.

[21] Appl. No.: 629,726

[22] Filed: Apr. 9, 1996

[51] Int. Cl.⁶ ..................................................... A01F 12/00
[52] U.S. Cl. ............................................. 460/74; 460/114
[58] Field of Search ............................... 460/114, 74, 85, 460/115, 119

[56] References Cited

U.S. PATENT DOCUMENTS

| | | |
|---|---|---|
| 798,957 | 9/1905 | Good . |
| 1,290,610 | 1/1919 | Luedke . |
| 2,589,440 | 3/1952 | Sharpe . |
| 3,011,497 | 12/1961 | Larsson et al. . |
| 3,456,786 | 7/1969 | Lee . |
| 3,635,336 | 1/1972 | Chapman . |
| 3,797,502 | 3/1974 | Reed et al. . |
| 3,945,178 | 3/1976 | Delfosse et al. . |
| 4,007,744 | 2/1977 | Shaver . |
| 4,100,720 | 7/1978 | Carnewal et al. . |
| 4,103,691 | 8/1978 | Shaver . |
| 4,108,150 | 8/1978 | Shaver . |
| 4,154,250 | 5/1979 | Stuber . |
| 4,180,081 | 12/1979 | Shaver . |
| 4,206,581 | 6/1980 | Haake et al. . |
| 4,270,551 | 6/1981 | Johnston et al. . |
| 4,367,756 | 1/1983 | Roderfeld et al. . |
| 4,369,617 | 1/1983 | Hanaway et al. . |
| 4,457,316 | 7/1984 | James . |
| 4,458,697 | 7/1984 | James . |
| 4,627,446 | 12/1986 | Huhman . |
| 4,821,744 | 4/1989 | Turner et al. . |

FOREIGN PATENT DOCUMENTS

| | | |
|---|---|---|
| 222254 | 6/1959 | Australia . |
| 474148 | 6/1951 | Canada . |
| 3022310 A1 | 2/1989 | European Pat. Off. . |
| 642914 | 3/1937 | Germany . |

OTHER PUBLICATIONS

Sales Literature of John Deere for Grain and Maize Combines/Grain Windrowers (Date of publication unknown; at least one year prior to date of this filing.).

*Primary Examiner*—Terry Lee Melius
*Attorney, Agent, or Firm*—Litman, McMahon & Brown, L.L.C.

[57] ABSTRACT

An accelerator roll assembly for combines wherein one of the accelerator rolls comprises a conveyor roller having a conveyor belt extending therearound. The improved accelerator roll assembly is particularly adapted for use in a combine including a threshing assembly, straw walkers and a cleaning section and which further includes a belt type conveyor for conveying threshed material falling through the straw walkers to an opening to the cleaning section. An accelerator roll is mounted in front of and in closely spaced relation to a drive roller for the conveyor such that the accelerator roll and the conveyor belt passing around the conveyor drive roller cooperate to accelerate, in a downward direction, threshed material passing therebetween. The threshed material is directed through a rearwardly directed stream of air of sufficient velocity to entrain and carry rearward the lighter chaff and stalk particles while the heavier kernels of grain pass downward through the stream of air to the grain pan.

9 Claims, 3 Drawing Sheets

5,769,712

COMBINE UTILIZING BELT CONVEYOR ROLLER AS AN ACCELERATOR ROLL

BACKGROUND OF THE INVENTION

1. Field of the Invention

This invention relates to improvements to accelerator rolls for combines.

2. Prior Art

The use of an accelerator roll assembly comprising a pair of accelerator rolls axially aligned in closely spaced relation is well known in axial flow or rotary combines as shown in U.S. Pat. No. 4,007,744 to J. Lyle Shaver and U.S. Pat. No. 4,458,697 to Larry R. James. In an axial flow combine, helical ribs in the inside of the cage of the threshing cylinder advance the material axially within the threshing cylinder. Threshed material, primarily kernels of grain, chaff and small pieces of stalk or straw, passes downward by gravity through a concave below the threshing cylinder and the remaining material, primarily larger pieces of stalk or straw, is advanced out an opening at one end of the cylinder and then rearward by a discharge beater.

Threshed material falling through the concave below the threshing cylinder or rotor is directed between the accelerator rolls positioned therebelow which accelerate the threshed material downward toward a grain pan in a cleaning section. A rearwardly directed air stream intersects the downwardly accelerated material and blows the chaff and small stalk particles rearward from the combine while the grain falls into the grain pan.

In conventional combines, the material is directed straight past or rearward past the threshing cylinder with a substantial portion of the threshed material falling through the concave positioned therebelow and the remaining material being directed rearward and downward onto an assembly of several straw walkers. Threshed material passing through the concave either falls directly through an opening to a cleaning section or falls onto a conveyor assembly and is conveyed rearward to the opening to the cleaning section. Threshed material passing through the straw walkers falls onto a conveyor and is advanced forward to the cleaning section for further cleaning. Augers and downwardly inclined shaker pans are typically used as the conveyor to convey the threshed material to the opening to the cleaning section.

Accelerator rolls have not been incorporated into currently available conventional combines. One factor limiting the utilization of accelerator rolls in conventional combines is height considerations. In a conventional combine utilizing augers to convey threshed material back to the opening to the cleaning section, the addition of the accelerator rolls would require raising of the augers so that threshed material carried forward by the augers can fall into the accelerator rolls. Raising the augers requires raising of the straw walkers and the combine engine, which is typically mounted above the straw walkers, thereby raising the overall height of the combine. The increased height increases shipping costs and reduces the maneuverability of the combine. Similarly, adding accelerator rolls to a conventional combine utilizing a shaker pan for conveying threshed material from the straw walkers back the opening to the cleaning section would require raising the straw walkers and the engine to accommodate the accelerator rolls.

It would be advantageous to incorporate an accelerator roll assembly into a conventional combine in such a manner that did not increase the overall height of the combine.

SUMMARY OF THE INVENTION

The present invention comprises an improvement to combines having an accelerator roll assembly generally comprising a pair of accelerator rolls. One of the accelerator rolls in the improved combine comprises a conveyor roller with a conveyor belt extending therearound.

The improved accelerator roll assembly is particularly well adapted for use in a conventional combine including a threshing assembly, a set of straw walkers and a cleaning section. The combine includes a belt type conveyor for conveying threshed material falling through the straw walkers to an opening to the cleaning section. An accelerator roll is mounted in front of and in closely spaced relation to a front conveyor roller, preferably the drive roller, such that the accelerator roll and the conveyor belt passing around the front conveyor roller cooperate to accelerate, in a downward direction, threshed material passing therebetween.

The threshing assembly includes at least one threshing cylinder rotatably mounted within the combine above a concave. The straw walker is mounted within the combine such that a front end of the straw walker is positioned behind and below at least a portion of the threshing assembly. The straw walker extends rearward and upward from the front end thereof. The cleaning section which includes a shaker shoe assembly having a grain pan at a front end thereof is positioned below the concave.

The front conveyor roller is rotatably mounted on a generally horizontal axis at a front end of the conveyor below the concave and above the grain pan. An accelerator roll is rotatably mounted on a generally horizontal axis in closely spaced relation and in parallel alignment with the front conveyor roller. The accelerator roll is preferably vertically offset above the axis of the front conveyor roller whereby threshed material is accelerated downward and forward to the grain pan by the accelerator roll and the conveyor belt passing over the front conveyor roller.

The front conveyor roller is directly connected by sprockets to the accelerator roll such that the front conveyor roller and the accelerator roll rotate in opposite directions toward each other. Threshed material falling from the concave and threshed material carried forward by the conveyor passes between the accelerator roll and said the conveyor belt as it passes around the front conveyor roller and is accelerated downward thereby to the grain pan.

A rearward flow of air is directed through and transverse to the accelerated threshed material to blow chaff and stalk particles rearward from the kernels of grain which pass downward to the grain pan.

OBJECTS AND ADVANTAGES OF THE INVENTION

Therefore it is an object of this invention to provide a combine having an accelerator roll assembly comprising a pair of accelerator rolls wherein at least one of the accelerator rolls comprises a conveyor roller.

It is a further object of this invention to provide an accelerator roll assembly for a conventional combine to accelerate threshed material into a cleaning section and through a stream of air to blow chaff and straw particles away from kernels of grain in the threshed material; to provide such a combine in which the addition of accelerator roll assembly does not substantially increase the overall height of the combine; to provide such a combine which includes a belt type conveyor for conveying threshed material from below a straw walker to the cleaning section; to provide such a combine wherein the belt type conveyor includes a conveyor drive roller at a front end thereof for driving the conveyor belt; to provide such a combine in which an accelerator roll is rotatably mounted in axial alignment and closely spaced relation with the conveyor drive roller; to provide such a combine in which the belt of the conveyor functions as an accelerator roll as it passes around the conveyor drive roller.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
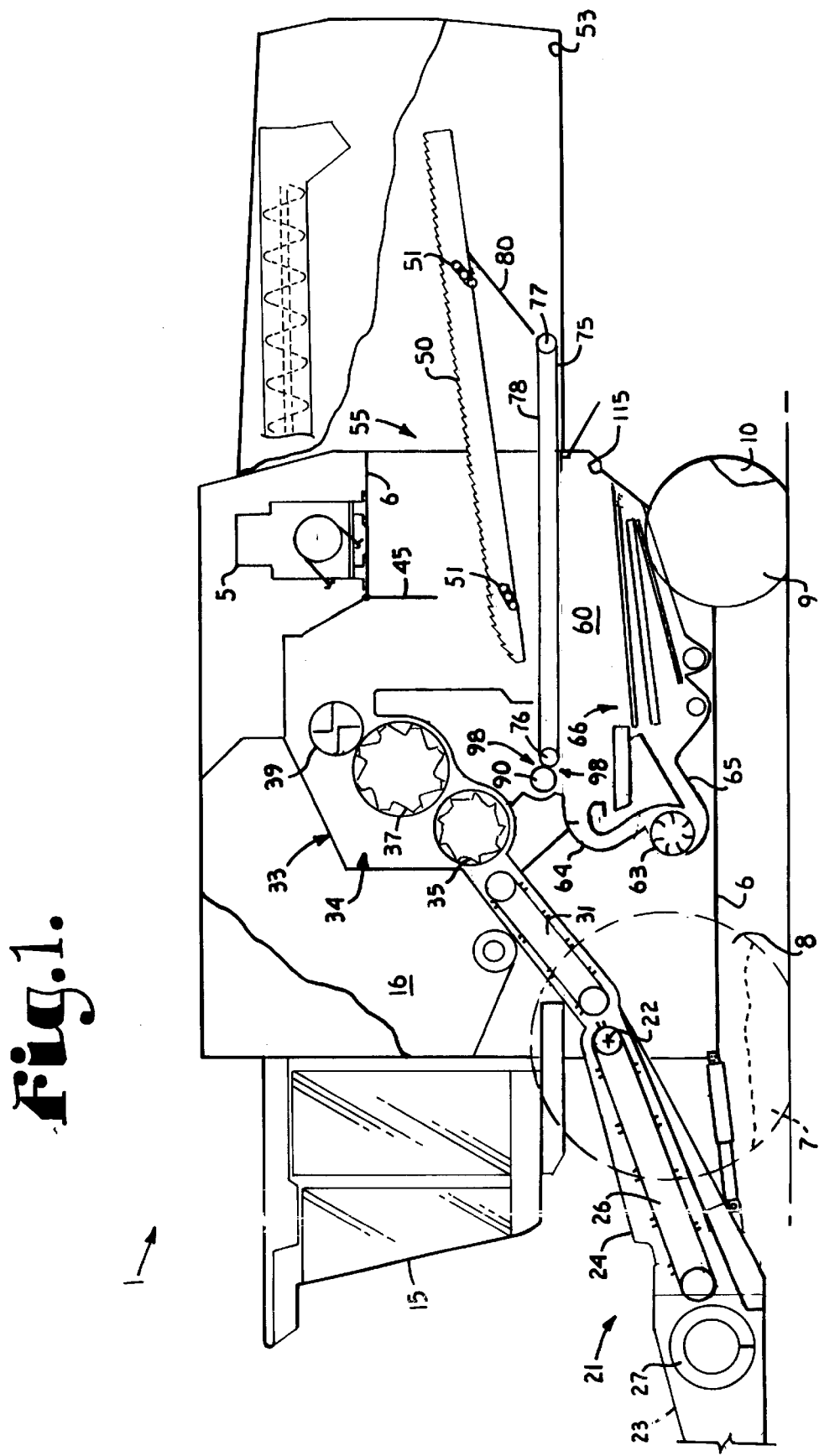
FIG. 1 is a left-hand side view of a combine of the present invention with portions broken away and parts shown schematically for purposes of illustrating the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 refers to a combine of the present invention. The combine 1 is powered by an internal combustion engine 5 mounted on a frame 6 supported by a pair of front drive wheels 7 and 8 and a pair of steerable rear wheels 9 and 10. The frame 6 supports an operator's cab 15 and a grain bin 16.

A header assembly 21 is pivotally connected at its rear end to a front end of the frame 6 along a transverse horizontal axis 22. The header assembly 21 includes a header 23 and a slat conveyor housing 24 in which a first slat conveyor or feed chain 26 is housed. The header includes a transverse auger 27 and a crop cutting mechanism (not shown). Crop material cut by the cutting mechanism is moved laterally inward from both sides of the header 23 by a transverse auger 27 to a central position where it is conveyed rearward by the first slat conveyor 26 to the front end of a second slat conveyor or feed chain 31. The second slat conveyor 31 then conveys the material rearward to an opening 32 to a threshing section 33.

Figure 2:
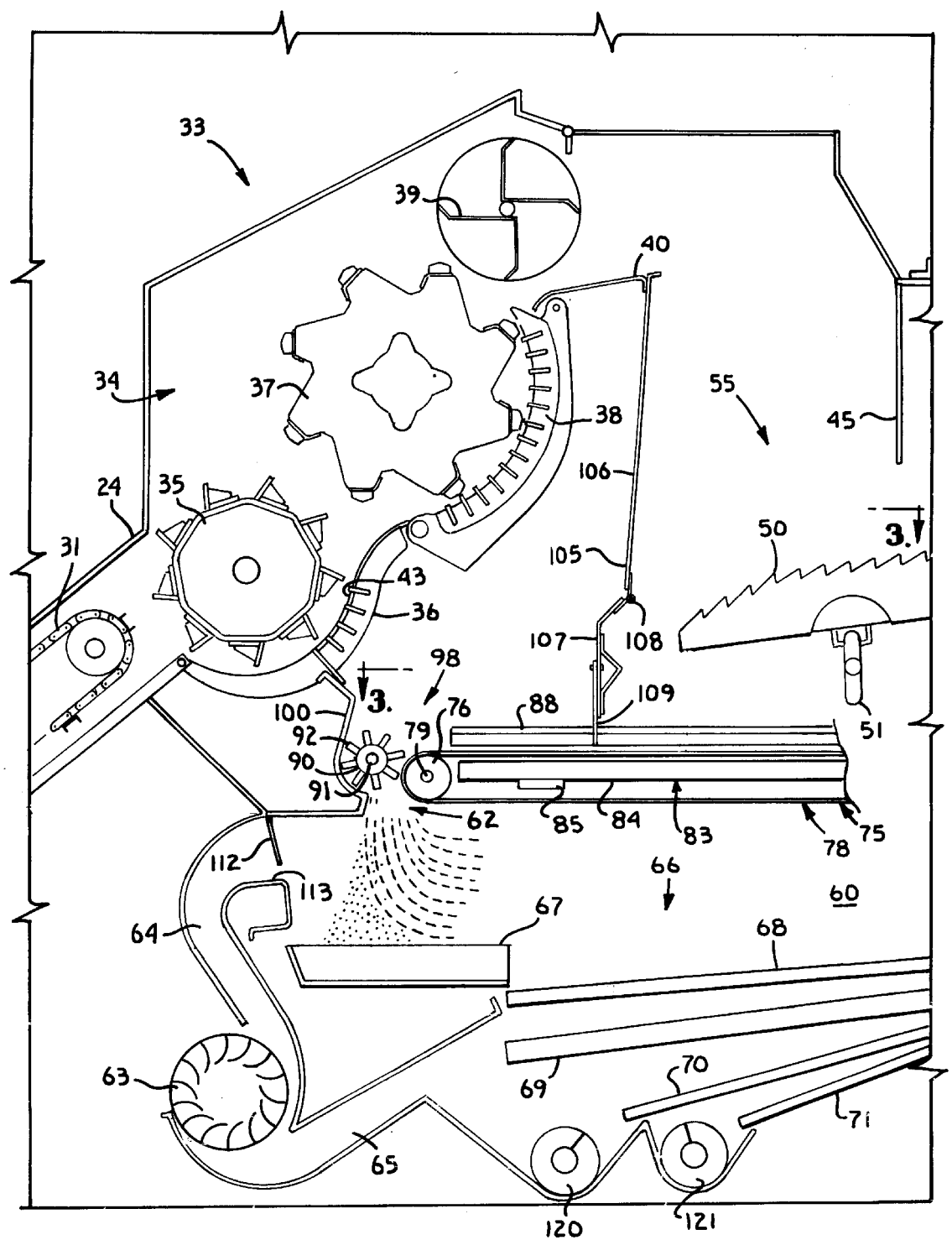
FIG. 2 is an enlarged and fragmentary left-hand side partially schematic view of the combine with portions broken away to show detail thereof.

A threshing assembly 34, in the threshing section 33 engages and threshes the crop material advanced thereto by the second slat conveyor 31. The threshing assembly 34, as shown in FIG. 2, includes a first threshing cylinder or rotor 35 with a first concave, grate or cage 36 supported therebelow, a second threshing cylinder or rotor 37 with a second concave, grate or cage 38 supported therebelow, and a wing beater 39 with a plurality of guide fingers 40 supported therebelow.

The first threshing cylinder 35 is rotatably and transversely mounted to left hand and right hand combine side walls 41 and 42 in closely spaced relation behind a rear end of the second slat conveyor 31. The second threshing cylinder 37 is rotatably and transversely mounted to the left and right hand combine sidewalls 41 and 42 in closely spaced relation behind and above the first threshing cylinder 35 and the wing beater 39 is rotatably and transversely mounted to the combine sidewalls in closely spaced relation behind and above the second threshing cylinder 37.

Crop material advanced to the threshing section 33 is advanced rearward between the first threshing cylinder 35 and the first concave 36 and the second threshing cylinder 37 and the second concave 38. As the crop material is advanced between the cylinders 35 and 37 and the concaves 36 and 38, the beating action therein separates kernels of grain from the stalks and husks. A substantial portion of the threshed material, generally comprising kernels of grain, chaff and small pieces of stalk or straw, falls through openings 43 and 44 in the concaves 36 and 38 respectively or through spaces between the fingers 40. The remaining threshed material and the threshing residue, generally larger pieces of the stalks or straw and other coarse material, are pushed or discharged out of the threshing section 33 by the wing beater 39 and across the guide fingers 40 which extend rearward from an upper end of the second concave 38.

The wing beater 39 directs the discharged material rearward against a curtain 45 extending across the path of the discharged material. The curtain 45 deflects the discharged material downward onto the front end of a set of straw walkers 50 which are mounted on crankshafts 51 and extend rearward. Most of the remaining threshed material discharged onto the straw walkers 50 is separated from the threshing residue and falls through openings 52 therein. The threshing residue is advanced rearward by the straw walkers 50 and out an opening 53 in the rear of the combine 1.

The portion of the combine 1 including the straw walkers 50 is generally referred to as a separating section 55 and the straw walkers 50 may be generally referred to as separators. It is foreseen that other types of separators or means for separating threshed material from the straw in the separating section could be utilized including means such as a rotary drum type separator.

A cleaning section 60 is positioned below the threshing section 33 and the separating section 55. A transverse slot or opening 62 to the cleaning section 60, extends between the threshing section 33 and the cleaning section 60 and is generally positioned directly below the threshing assembly 34. The cleaning section 60 generally includes a fan 63, upper and lower discharge ducts 64 and 65 and a shaker shoe assembly 66 mounted for longitudinal reciprocating movement. The shaker shoe assembly 66 includes a grain pan 67, chaffer 68, sieve 69, clean grain shaker pan 70 and tailings shaker pan 71.

A belt-type conveyor 75 extends horizontally below a portion of the straw walkers 50 and forward thereof generally to the opening 62 to the cleaning section 60. The conveyor 75 comprises a drive roller 76, an idler roller 77 and a conveyor belt 78. A shaft 79 of the drive roller or front conveyor roller 76 is rotatably mounted to the left and right hand side walls 41 and 42 of the combine 1 such that the drive roller 76 generally extends horizontally and generally defines a rear edge of the opening 62 to the cleaning section 60. The idler roller or rear conveyor roller 77 is rotatably mounted to the left and right hand side walls 41 and 42 of the combine 1 toward a rear end of the straw walkers 50.

A rear end of the conveyor 75 is spaced inward from or forward of a rear end of the straw walkers 50. A guide plate 80 is secured to the left and right hand side walls 41 and 42 and generally extends across a rear end of the conveyor 75 upward and rearward toward a rear portion of the straw walkers 50. The bottoms of the rear most portions of the straw walkers 50, behind the guide plate 80, are closed off such that any threshed material falling through openings 52 in the rearmost portions are directed forward to the guide plate 80 and then down onto the conveyor 75.

The drive roller 76 is driven by the power train from the engine which includes a V-belt 81 which engages a pulley 82 nonrotatably connected to the shaft 79 of the drive roller 76 on a right hand side thereof. The conveyor belt 78 is rotated counter-clockwise by the drive roller 76. Threshed material passing through the openings 52 in the straw walkers 50 falls onto an upper surface of the conveyor belt 78 and is carried forward therefrom toward the opening 62 to the cleaning section 60.

Figure 4:
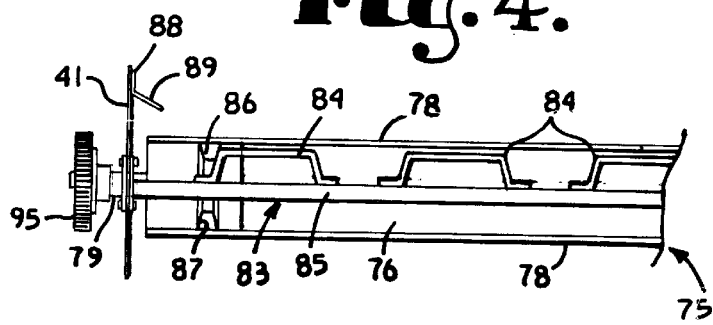
FIG. 4 is a fragmentary cross-sectional view taken generally along line 4—4 of FIG. 3.

A support structure 83, comprising a plurality of support panels 84 (three of which are shown in FIG. 4) supported on cross-members 85 (one of which is shown in FIGS. 2 and 4), is mounted to and extends between the left and right hand side walls 41 and 42 between the upper and lower portions of the conveyor belt 78 and between the front and rear conveyor rollers 76 and 77. The support structure 83 helps support the upper portion of the conveyor belt 78 as it carries threshed material forward.

The conveyor 75 incorporates conventional guide means for preventing the conveyor belt 78 from sliding or slipping from side to side on the front or rear conveyor rollers 76 and 77. Such means comprises a pair of beads 86 (one of which is shown in FIG. 4) secured to and extending around an inner surface of the conveyor belt 78 on opposite sides thereof and which are adapted to extend into corresponding grooves or guide channels 87 (one of which is shown in FIG. 4) in the rollers 76 and 77. The outermost support panels 84 are positioned in closely spaced relation to the beads 85 such that outermost support panels 84 to prevent the conveyor belt 78 from slipping or sliding from side to side.

A seal or guide strip 88, as best seen in FIG. 4, is mounted on each side wall 41 and 42 slightly above an upper surface of the conveyor belt 78. Each seal 88 extends from proximate a front end of the conveyor 75 to proximate a rear end thereof. A lower portion or leg 89 of each seal 88 is angled inward and downward toward the conveyor belt 78 with a lower end of the leg 89 spaced slightly above the belt 78 such that the seal 88 directs threshed material falling through the straw walkers 50 along the outer edges thereof inward on the conveyor belt 78 and away from the outer edges thereof.

Figure 3:
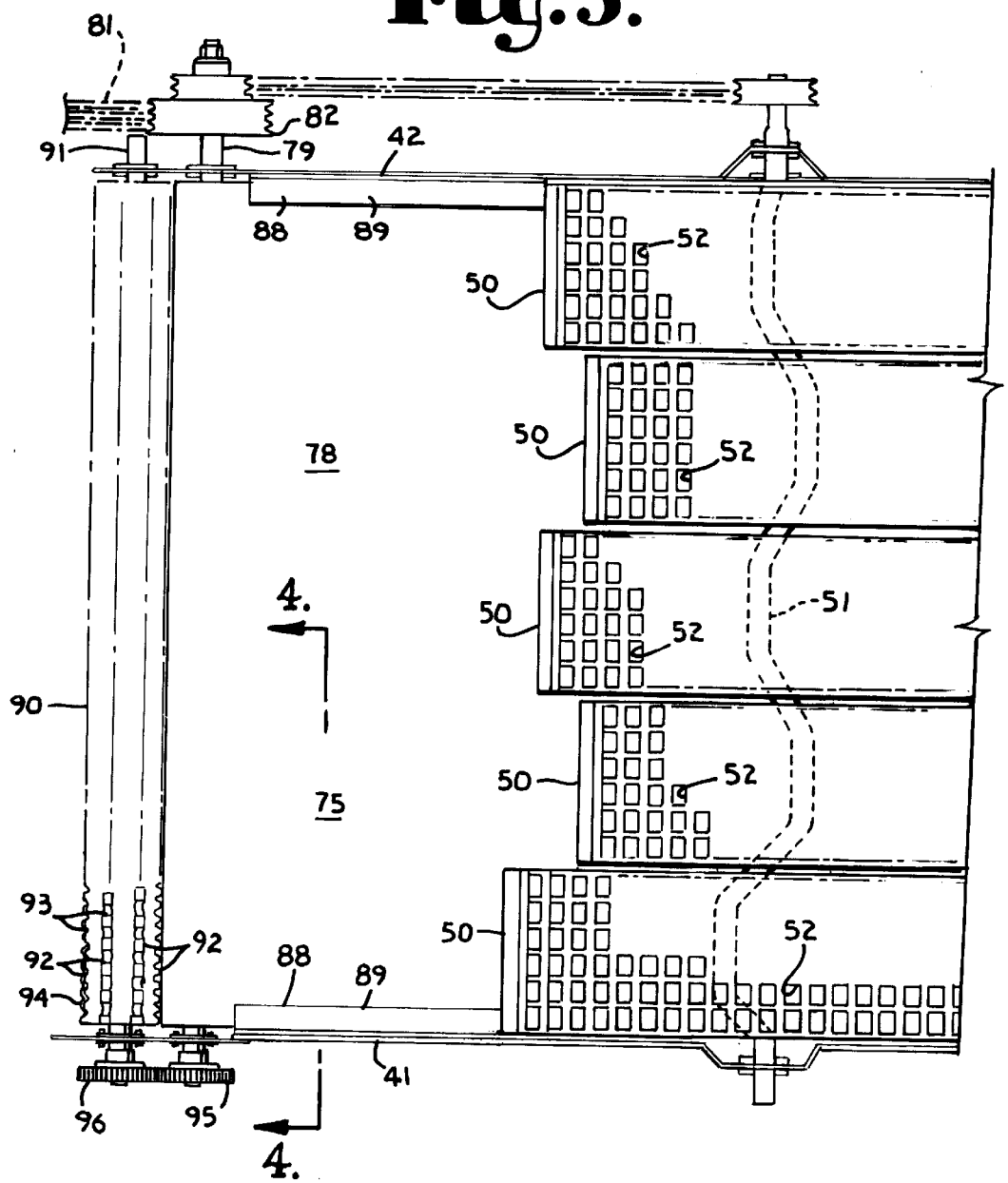
FIG. 3 is a fragmentary cross-sectional view taken generally along line 3—3 of FIG. 2 looking down on an accelerator roll assembly of the present invention.

Referring to FIGS. 2 and 3, an accelerator roll 90 having a shaft 91 is rotatably mounted to the left hand and right hand sidewalls 41 and 42 and extends horizontally in parallel and closely spaced relation to the conveyor drive roller 76. The axis of the accelerator roll 90 is vertically offset above the axis of the conveyor drive roller 76. The accelerator roll 90 comprises eight lugs 92 extending radially outward in uniform and circumferentially spaced relation. A plurality of semi-circular notches 93 are formed in and across an outer surface 94 of each lug 92.

The accelerator roll 90 is driven by a pair of meshing spur gears or sprockets 95 and 96 nonrotatably connected to the drive roller shaft 79 and the accelerator roll shaft 91 respectively on the left hand side thereof such that the accelerator roll 90 and the conveyor drive roller 76 rotate in opposite directions inward toward one another. The diameter of the sprockets 95 and 96 are the same such that the accelerator roll 90 and the conveyor drive roller 76 rotate at the same speed. The sprockets 95 and 96, the V-belt 81 and the pulley 82 generally comprise drive means for rotatably driving the conveyor drive roller 76 and the accelerator roll in opposite directions. It is foreseen that a wide range of conventional means could be utilized for driving the accelerator roll 90 and the conveyor drive roller 76 in opposite directions.

The accelerator roll 90 and a front end of the conveyor 75 positioned in closely spaced relation to the accelerator roll 90 generally comprise an accelerator roll assembly 98. Although the accelerator roll assembly 98 is shown with the drive roller 76 positioned adjacent the accelerator roll 90, it is foreseen that the idler roller 77 could be positioned adjacent the accelerator roll 90 with the drive roller 76 at an opposite end of the conveyor 75.

Threshed material, falling through the openings 43 and 44 in the first and second concaves 36 and 38 respectively or between the guide fingers 40, falls either onto the accelerator roll 90 or the conveyor belt 78 along a front end of the conveyor 75. A front wall or partition 100 is secured to and extends between the left hand and right hand side walls 41 and 42. An upper end of the front partition 100 is positioned in closely spaced relation to the first concave 36 in front of the openings 43 extending therethrough. The front partition 100 converges downward and rearward from the first concave 36 toward the accelerator roll 90 and then around a front side of the accelerator roll 90 to direct threshed material toward the accelerator roll 90.

A rear wall or partition 105 is secured to and extends between the left hand and right hand side walls 41 and 42. The rear wall 105 deflects threshed material downward onto the front end of the conveyor 75. An upper portion 106 of the rear wall 105 is pivotally connected to a lower portion 107 by hinge 108. The upper portion 106 extends up to the guide fingers 40 and may be pivoted rearward therefrom to provide access to the area below the first and second concaves 36 and 38. A rubber flap 109 is secured to and extends along a lower edge of the lower portion 107 of the rear wall 105. A lower edge of the flap 109 is spaced above the conveyor belt 78 a distance sufficient to allow threshed material to pass therebetween.

Threshed material falling onto the accelerator roll 90 and the conveyor 75 is carried to the nip extending therebetween such that the accelerator roll 90 and the portion of the conveyor belt 78 extending around the drive roller 76 engage the threshed material and throw or accelerate the threshed material downward and forward through the opening 62 to the cleaning section 60 and toward the grain pan 67. Offsetting the accelerator roll 90 slightly above the drive roller 76 results in the material being thrown forward which allows the grain pan 67 to be moved forward which reduces the overall length of the cleaning section 60.

The accelerator roll 90 and the drive roller 76 are driven at a speed sufficient to accelerate the threshed material to a velocity far in excess of the velocity the threshed material would have achieved by acceleration due to gravity alone. The threshed material is directed or thrown through a first stream of air produced by the fan 63 and directed rearward, above and across the shaker shoe assembly 66 by the upper discharge duct 64. The first stream of air is passes around difuser strips 112 secured to and extending downward substantially across an opening 113 to the upper discharge duct 64 and then transversely through the accelerated threshed material such that the first stream of air blows the lighter chaff and small stalk or straw particles rearward out a discharge opening 115 at a rear of the cleaning section 60. The heavier kernels of grain pass through the first stream of air and onto the grain pan 67. Acceleration of the threshed material allows the velocity of the first air stream to be increased which results in more effective separation of chaff and straw particles from the kernels of grain.

As the shaker shoe assembly 66 reciprocates fore and aft, the kernels of grain in the grain pan 67 advance rearward to the chaffer 68. Clean grain falls through holes (not shown) in the chaffer 68 and the sieve 69 and onto the clean grain shaker pan 70 which directs or guides the clean grain to a clean grain auger 120 which moves the clean grain (by conventional means not shown) to the grain bin 16. Kernels of grain not yet separated from the husks or stems are advanced rearward on the sieve 69 and fall over a rear end thereof onto the tailings shaker pan 71 which guides the material down to a tailings auger 121 which moves the material (by conventional means not shown) to the threshing section 33 to pass through the threshing assembly again to repeat the threshing and separation process.

A second stream of air from the fan 63, directed through the lower discharge duct 65, is blown up through the sieve 69 and the chaffer 68. Air blowing up through the chaffer 68 entrains and blows rearward and out the discharge opening 115 chaff or straw particles which may have settled on the chaffer 68. A portion of the second stream of air also entrains and blows chaff or straw particles which have passed through the chaffer rearward over the end of the sieve 69 and onto the tailings shaker pan. The fan 63, upper discharge duct 64 and lower discharge duct 65 function as air delivery means for directing the stream of air rearward through and transverse to the accelerated threshed material to blow chaff and straw particles rearward from the kernels of grain which pass downward to said shaker shoe assembly 66 and for directing a stream of air up through the sieve 69 and chaffer 68 for removing or separating chaff and straw particles from the grain therein.

It is foreseen that the conveyor 75 could have a plurality of lugs or projections secured to and extending across the conveyor belt 78 in uniformly spaced relationship and sized and spaced apart with their rotation timed such that the lugs or projections on the conveyor belt 78 would intermesh with the lugs 92 on the accelerator roll 90.

It is foreseen that the threshing assembly could be of a wide range of configurations, including a single threshing cylinder and concave or three threshing cylinders and concaves. Further it is foreseen that the threshing cylinder could be aligned longitudinally with the direction of travel of the combine.

It is also foreseen that the use of a conveyor roller as at least one of the accelerator rolls in an accelerator roll assembly could be used in combines of various configurations. For example, in some combines, the opening to the cleaning section is positioned between the threshing section and the separating section. Threshed material falling through concaves in the threshing section falls onto rearward flighted auger type conveyors which carry the threshed material rearward to the opening to the cleaning section such that the threshed material falls therein while threshed material falling through the straw walkers is carried forward to the opening to the cleaning section by forward flighted auger type conveyors. It is foreseen that the rearward and forward flighted auger type conveyors could be replaced by front and rear belt type conveyors each having a conveyor roller positioned above the opening to the cleaning section in closely spaced relation to one another. The closely spaced conveyor rollers would engage threshed material carried rearward by the front conveyor and threshed material carried forward by the rear conveyor and throw or accelerate the threshed material into the cleaning section and through a stream of air for cleaning purposes as discussed above.

It is to be understood that while certain forms of the present invention have been illustrated and described herein, it is not to be limited to the specific forms or arrangement of parts described and shown.

What is claimed and desired to be secured by letters patent is as follows:

1. A combine having an accelerator roll assembly comprising:
   a. a front conveyor roller and a rear conveyor roller rotatably mounted within said combine and having a conveyor belt extending therearound;
   b. a single accelerator roll rotatably mounted within said combine in closely spaced relation and parallel alignment with said front conveyor roller such that crop material passing between said front conveyor roller and said accelerator roll is accelerated thereby; an axis of said accelerator roll is vertically offset above an axis of said front conveyor roller; and
      (a) drive means for rotating said front conveyor roller and said accelerator roll in opposite directions.

2. The accelerator roll assembly as in claim 1 wherein:
   a. said front conveyor roll comprises a drive roller.

3. The accelerator roll assembly as in claim 1 wherein:
   a. said accelerator roll includes a plurality of lugs extending radially therefrom in uniformly spaced relation.

4. The accelerator roll assembly as in claim 1 wherein said conveyor extends generally horizontally.

5. In a combine having a threshing assembly, a separator positioned generally behind said threshing assembly and a cleaning section including a shaker shoe assembly positioned below said threshing assembly; the improvement comprising:
   a. a conveyor including a front conveyor roller and a conveyor belt; said conveyor positioned below at least a portion of and extending forward of said separator for carrying threshed material passing through the separator forward therefrom; said front conveyor roller rotatably mounted at a front end of said conveyor below said threshing assembly and above said shaker shoe assembly and being disposed on a generally horizontal axis;
   b. an accelerator roll rotatably mounted in said combine on a generally horizontal axis in closely spaced relation in front of said front conveyor roller and extending parallel therewith;
   c. drive means for rotating said front conveyor roller and said accelerator roll in opposite directions such that threshed material falling from a concave of said threshing assembly and carried forward by said conveyor passes between said accelerator roll and said conveyor belt as it passes around the front conveyor roller and is accelerated downward thereby to said shaker shoe assembly; and
   d. air delivery means for directing a stream of air rearward through and transverse to the accelerated threshed material to blow chaff and straw particles rearward from kernels of grain which pass downward to said shaker shoe assembly.

6. The combine as in claim 5 wherein:

a. the axis of said accelerator roll is vertically offset above the axis of the front conveyor roller whereby threshed material is accelerated downward and forward to said shaker shoe assembly by said accelerator roll and conveyor belt passing over said front conveyor roller.

7. The combine as in claim 5 wherein:

a. said accelerator roll includes a plurality of lugs extending radially therefrom in uniformly spaced relation.

8. The combine as in claim 5 wherein said conveyor extends generally horizontally.

9. In a combine having a threshing assembly, a straw walker assembly positioned generally behind said threshing assembly and a cleaning section including a shaker shoe assembly positioned below said threshing assembly; the improvement comprising:

a. a conveyor comprising a drive roller, an idler roller and a conveyor belt; said conveyor positioned below at least a portion of and extending forward of said straw walker for carrying threshed material passing through the straw walker forward therefrom; said drive roller rotatably mounted at a front end of said conveyor below said threshing assembly and above said shaker shoe assembly and being disposed on a generally horizontal axis;

b. an accelerator roll including a plurality of lugs extending radially outward in uniformly spaced relation; said accelerator roll being disposed on a generally horizontal axis in closely spaced relation in front of and slightly above said axis of said conveyor drive roller and extending parallel therewith;

c. drive means for rotating said conveyor drive roller and said accelerator roll in opposite directions such that threshed material falling from a concave of said threshing assmebly and carried forward by said conveyor passes between said accelerator roll and said conveyor belt as it passes around said conveyor drive roller and is accelerated downward thereby to said shaker shoe assembly; and d. air delivery means for directing a stream of air rearward through and transverse to the accelerated threshed material to blow chaff and straw particles rearward from kernels of grain which pass downward to said shaker shoe assembly.

\* \* \* \* \*